United States Patent
Brandwine

(10) Patent No.: US 9,264,334 B1
(45) Date of Patent: *Feb. 16, 2016

(54) MANAGING POWER CONSUMPTION IN A DATA CENTER

(71) Applicant: Amazon Technologies, Inc., Reno, NV (US)

(72) Inventor: Eric Jason Brandwine, Haymarket, VA (US)

(73) Assignee: Amazon Technologies, Inc., Reno, NV (US)

( * ) Notice: Subject to any disclaimer, the term of this patent is extended or adjusted under 35 U.S.C. 154(b) by 12 days.

This patent is subject to a terminal disclaimer.

(21) Appl. No.: 14/078,365

(22) Filed: Nov. 12, 2013

Related U.S. Application Data

(63) Continuation of application No. 13/495,983, filed on Jun. 13, 2012, now Pat. No. 8,595,379, which is a continuation of application No. 12/591,990, filed on Dec. 7, 2009, now Pat. No. 8,224,993.

(51) Int. Cl.
  G06F 15/173 (2006.01)
  H04L 12/26 (2006.01)

(52) U.S. Cl.
  CPC .................................. H04L 43/0876 (2013.01)

(58) Field of Classification Search
  None
  See application file for complete search history.

(56) References Cited

U.S. PATENT DOCUMENTS

| | | | |
|---|---|---|---|
| 5,325,496 A | 6/1994 | Hays et al. | 395/400 |
| 5,388,233 A | 2/1995 | Hays et al. | 395/375 |
| 5,572,700 A | 11/1996 | Hays et al. | 395/466 |
| 5,640,533 A | 6/1997 | Hays et al. | 395/460 |
| 5,640,569 A | 6/1997 | Miller et al. | 395/729 |
| 5,640,582 A | 6/1997 | Hays et al. | 395/800 |
| 6,356,989 B1 | 3/2002 | Hays et al. | 711/205 |
| 6,912,229 B1 | 6/2005 | Lauro et al. | 370/465 |
| 6,993,504 B1 | 1/2006 | Friesen et al. | 705/37 |
| 7,035,972 B2 | 4/2006 | Guha et al. | 711/114 |
| 7,210,005 B2 | 4/2007 | Guha et al. | 711/114 |
| 7,243,121 B2 | 7/2007 | Neiman et al. | 709/201 |
| 7,246,093 B1 | 7/2007 | Katz | 705/37 |
| 7,251,629 B1 | 7/2007 | Marynowski et al. | 705/37 |
| 7,281,145 B2 | 10/2007 | Merkin et al. | 713/320 |
| 7,461,273 B2 | 12/2008 | Moore et al. | 713/300 |
| 7,609,574 B2 | 10/2009 | Hays | 365/215 |
| 7,609,575 B2 | 10/2009 | Hays | 365/215 |
| 7,664,968 B2 | 2/2010 | Bahali et al. | 713/300 |

(Continued)

OTHER PUBLICATIONS

"On-Demand Enterprise: Sun to be Part of First Online Compute Exchange," Feb. 14, 2005, retrieved Aug. 18, 2008, from http://www.printthis.clickability.com/pt/cpt?action=cpt&title=On-Demand+Enterprise%3A+Sun+. . . , 2 pages.

(Continued)

*Primary Examiner* — Mohamed Ibrahim
(74) *Attorney, Agent, or Firm* — Seed IP Law Group PLLC

(57) ABSTRACT

Systems and methods are provided for managing resources. In one implementation, a method is provided in which a management server determines whether a condition related to one or more resources has occurred. The management server further determines at least one program instance to terminate. The at least one program instance executes on one of a plurality of servers. The management server further terminates the determined at least one program instance, which was used by an excess program execution capacity user.

25 Claims, 4 Drawing Sheets

(56) References Cited

U.S. PATENT DOCUMENTS

| | | |
|---|---|---|
| 8,001,407 B2 | 8/2011 | Malone et al. .............. 713/323 |
| 8,209,413 B1 * | 6/2012 | Turrichi et al. ............. 709/224 |
| 8,249,904 B1 | 8/2012 | DeSantis et al. ............ 705/7.12 |
| 2002/0038279 A1 | 3/2002 | Samuelson et al. ............ 705/37 |
| 2002/0091653 A1 | 7/2002 | Peevey ........................ 705/412 |
| 2003/0026208 A1 | 2/2003 | Bijwaard et al. ............. 370/236 |
| 2005/0021438 A1 | 1/2005 | Tezuka et al. ................ 705/36 |
| 2005/0120160 A1 | 6/2005 | Plouffe et al. .................... 711/1 |
| 2005/0192969 A1 * | 9/2005 | Haga et al. .................... 707/10 |
| 2006/0005181 A1 | 1/2006 | Fellenstein et al. .......... 717/174 |
| 2006/0069621 A1 | 3/2006 | Chang et al. .................. 705/26 |
| 2006/0155555 A1 | 7/2006 | Barsness et al. .................. 705/1 |
| 2006/0179106 A1 | 8/2006 | Turner et al. ................. 709/201 |
| 2006/0190605 A1 | 8/2006 | Franz et al. .................. 709/226 |
| 2006/0195508 A1 | 8/2006 | Bernardin et al. ............ 709/203 |
| 2006/0265371 A1 | 11/2006 | Edmond et al. .................. 707/7 |
| 2007/0180314 A1 * | 8/2007 | Kawashima et al. ........... 714/15 |
| 2008/0005327 A1 | 1/2008 | Hays ............................ 709/225 |
| 2008/0034057 A1 | 2/2008 | Kumar et al. ................. 709/217 |
| 2009/0187776 A1 | 7/2009 | Baba et al. ................... 713/320 |
| 2009/0204267 A1 * | 8/2009 | Sustaeta et al. ............... 700/291 |
| 2009/0228726 A1 | 9/2009 | Malik et al. .................. 713/320 |
| 2010/0088205 A1 | 4/2010 | Robertson ....................... 705/34 |
| 2010/0312893 A1 * | 12/2010 | Watanabe et al. ............. 709/226 |

OTHER PUBLICATIONS

"What is Google App Engine?—Google App Engine," retrieved Dec. 16, 2008, from http://code.google.com/appengine/docs/whatisgoogleappengine.html, 4 pages.

Jelling, J., "Your PC can Contribute with Google Compute," Sep. 29, 2004, retrieved Jul. 26, 2008, from http://www.webpronews.com/topnews/2004/09/29/your-pc-can-contribute-with-google-co . . . , 2 pages.

McDonald, P., Google App Engine Blog, "Announcing Open Signups, Expected Pricing, and two new APIs," May 28, 2008, retrieved Jul. 26, 2008, from http://googleappengine.blogspot.com/2008/05/announcing-open-signups-expected,html, 2 pages.

* cited by examiner

MANAGING POWER CONSUMPTION IN A DATA CENTER

CROSS-REFERENCE TO RELATED APPLICATIONS

This application is a continuation of co-pending U.S. application Ser. No. 13/495,983, filed Jun. 13, 2012 and entitled "Managing Power Consumption in a Data Center," which is hereby incorporated by reference in its entirety. U.S. application Ser. No. 13/495,983 is a continuation of U.S. application Ser. No. 12/591,990, filed Dec. 7, 2009 and entitled "Managing Power Consumption in a Data Center," now U.S. Pat. No. 8,224,993, which is hereby incorporated by reference in its entirety.

BACKGROUND

Computer infrastructure services providers supply dynamically scalable and abstracted resources as services over the Internet, as well as maintain computers on which users can run applications and store data. Computer infrastructure services providers locate the computers that comprise such infrastructures in one or more facilities that are commonly referred to as data centers. A small data center may occupy a room or a floor of a building, while a large data center may occupy several floors or an entire building. A typical data center may house many computers, such as servers, along with other components (e.g., backup power generators, un interruptible power supplies, power distribution units, etc.) that support the resources of the data center. Data centers also are built in non-traditional ways, such as within shipping containers or on boats.

Power is a commodity that is essential to running a data center. Power also is the most constrained resource that is used in a data center. The power consumption of components within a data center varies with the utilization of the components. For example, as a server becomes more heavily loaded, it consumes more power. To avoid unexpected failures, it is thus necessary to provision sufficient power to drive every component of a data center, such as servers, at full utilization. However, because all components of a data center rarely operate at full utilization at all times, a data center typically will significantly over-provision power.

Over-provisioning power that is not used efficiently results in a cost increase for all resources within a data center. For example, a server that remains idle or that experiences a small load will nevertheless require a significant power budget in case its load suddenly increases. Increasing utilization of the power delivered to a data center can significantly reduce the cost of operating the data center.

While it is possible to operate individual resources in a data center at levels that are near or over capacity, a sudden utilization increase of some resources may drive overall power consumption beyond the data center's available supply. As a result, the data center may need to shut down certain resources or some resources may experience sudden failures. Resources that are shut down or fail unexpectedly prevent the computer infrastructure services provider from providing services to customers and can cause data loss or corruption. As a result of these considerations, on the one hand, a computer infrastructure services provider who is trying to maximize power utilization may oversubscribe power of resources to minimize costs, but risks having resources shut down when power consumption exceeds supply. On the other hand, the computer infrastructure services provider instead may over provision power, which increases power costs. The problem is further complicated by the fact that external environmental factors, such as an increase in temperature, may cause an increase in power consumption, such as by requiring additional cooling capacity to be brought online. Therefore, there is a need for improved systems and methods that provide power management for facilities, such as data centers.

BRIEF DESCRIPTION OF THE DRAWINGS

The accompanying drawings, which are incorporated in and constitute a part of this disclosure, illustrate various disclosed embodiments. In the drawings.

DETAILED DESCRIPTION

Figure 1:
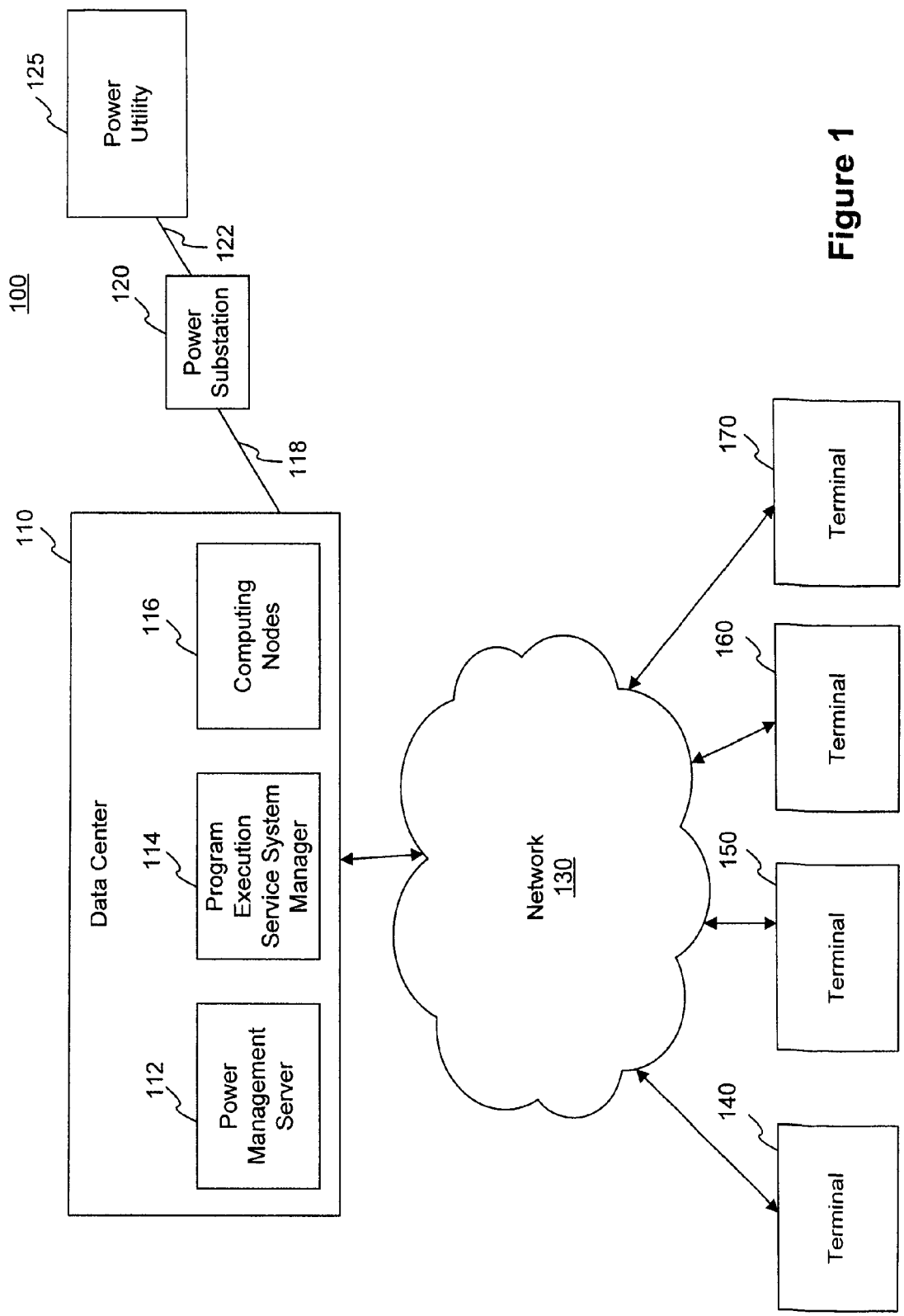
FIG. 1 is a diagram of an example of a system providing computing resources to users.

The following detailed description refers to the accompanying drawings. Wherever possible, the same reference numbers are used in the drawings and the following description to refer to the same or similar parts. While several illustrative embodiments are described herein, modifications, adaptations and other implementations are possible. For example, substitutions, additions or modifications may be made to the components illustrated in the drawings, and the illustrative methods described herein may be modified by substituting, reordering, removing, or adding blocks to the disclosed methods. Accordingly, the following detailed description is not limiting of the disclosed embodiments. Instead, the proper scope is defined by the appended claims.

Disclosed embodiments provide systems and methods for managing power consumption in a data center by, for example, terminating resources or shutting down resources in the data center. In some embodiments, terminating resources may comprise terminating program instances, such as program instances belonging to certain users who make use of services supplied by a computer infrastructure services provider associated with the data center. As the term is used herein, a "program instance" is an occurrence or representation of an object. For example, the computer infrastructure services provider may provide various service categories or service class levels, such as dedicated program execution capacity users, on-demand variable program execution capacity users, and excess program execution capacity users. These categories or service levels may be specified by service agreements between the computer infrastructure services provider and users. In some embodiments, the termination of resources or shutting down of resources may occur according to rules that prioritize these user categories or service levels. For example, service agreements may specify acceptable delays related to the availability of data.

Consistent with a disclosed embodiment, a computer-implemented method is provided for managing resources of a computer infrastructure services provider. The method comprises receiving, by a management server, data from a plurality of resources of a data center. The data reflects power usage of at least one of the plurality of resources of the data center, processing loads of at least one of a plurality of servers in the data center, or at least one environmental condition related to the data center. The management server determines whether a condition related to one or more of resources in the data center has occurred and receives priority data reflecting priorities for terminating or shutting down resources of the data center. The management server further determines, based at least on the priority data, at least one of the plurality of resources of the data center to terminate or shut down. The management server terminates or shuts down the determined at least one of the plurality of resources.

Consistent with another disclosed embodiment, a computer-implemented method is provided for managing resources. The method comprises determining, by a management server, whether a condition related to one or more resources has occurred. The management server determines at least one program instance to terminate. The at least one program instance is executing on one of a plurality of servers. The management server terminates the determined at least one program instance, which was used by an excess program execution capacity user.

Consistent with another disclosed embodiment, a computer-implemented method is provided for managing resources. The method comprises determining, by a management server, whether a condition related to one or more resources has occurred. The management server receives data reflecting terms of service related to data being stored by at least one server. The management server determines whether to power down the at least one server, based at least on the terms of service. The management server further powers down the at least one server.

Consistent with yet another disclosed embodiment, a system is provided for managing resources. The system comprises a processor for executing program instructions and a memory storing the program instructions. The program instructions are executed by the processor to perform a process. The process includes determining whether a condition related to one or more resources has occurred and determining at least one program instance to terminate. The at least one program instance is executing on one of a plurality of servers. The process further includes terminating the determined at least one program instance, which was used by an excess program execution capacity user.

Consistent with yet another disclosed embodiment, a system is provided for managing resources. The system comprises a processor for executing program instructions and a memory storing the program instructions. The program instructions are executed by the processor to perform a process. The process includes determining whether a condition related to one or more resources has occurred and receiving data reflecting terms of service related to data being stored by at least one server. The process further includes determining whether to power down the at least one server, based at least on the terms of service, and powering down the at least one server.

Consistent with other disclosed embodiments, computer-readable storage media may store program instructions, which are executed by a processor and perform any of the methods described herein.

FIG. 1 is an example of a system 100 providing computing resources to users, consistent with a disclosed embodiment. For example, system 100 may provide functionality for the users to store data and/or execute programs using the computing resources, such as computing nodes 116. As shown in system 100, data center 110 and terminals 140-170 are connected to a network 130. Data center 110 is connected via power lines 118 to power substation 120, which is connected via power lines 122 to power utility 125. As the term is used herein, a "data center" encompasses any traditional location (e.g., a building) housing one or more computers, such as servers, and may include other components (e.g., backup power generators, uninterruptible power supplies, power distribution units, etc.) that support the resources of the data center, as well as encompasses any non-traditional location, such as, for example, a data center built within a shipping container or located on a boat. Furthermore, one of skill in the art will appreciate that although one data center and three terminals are depicted in FIG. 1, alternative numbers of these components may be provided. Furthermore, power lines 118 and power lines 122 may include any number of lines, substations, transformers, etc., necessary to deliver electrical power from power utility 125 to data center 110.

Network 130 provides communications between the resources (e.g., computing nodes 116) of data center 110 and terminals 140-170. In addition, the resources of data center 110 and terminals 140-170 may access legacy systems (not shown) via network 130, or may directly access legacy systems, data stores, or other network applications. Network 130 may be a shared, public, or private network, may encompass a wide area or local area, and may be implemented through any suitable combination of wired and/or wireless communication networks. Network 130 may further comprise an intranet and/or the Internet.

Data center 110 may house various interconnected computing systems (e.g., resources of a computing infrastructure services provider, such as computing nodes 116). Consistent with disclosed embodiments, data center 110 may be operated by and on behalf of a single user or by a provider (e.g., a computer infrastructure services provider) that supplies computing resources to users and/or customers. For example, a computer infrastructure services provider may supply dynamically scalable and virtualized resources as services over the Internet (e.g., network 130). Furthermore, the computer infrastructure services provider may supply resources (e.g., computing nodes 116) on which users can run applications and store data.

As shown in FIG. 1, data center 110 includes power management server 112, program execution service system manager 114, and computing nodes 116. Power management server 112 may provide functionality for monitoring and managing the power consumption of components of data center 110, such as computing nodes 116. Program execution service system manager 114 may manage the execution of programs for multiple users, such as users executing programs on computing nodes 116. Additional details regarding power management server 112 and program execution service manager 114 are discussed below in connection with FIGS. 2 and 3.

Computing nodes 116 may comprise multiple physical computing systems and/or virtual machines that are hosted on one or more physical computing systems for executing user programs and/or storing user data. For example, via terminals 140-170, users may upload applications, libraries, data, network resources, directory resources, and associated configuration settings to computing nodes 116 and request a number of virtual machines (i.e., server instances), on which the users may load applications. The users also may increase or decrease, as needed, how much central processing unit (CPU) and storage capacity is needed to run the applications. Further details regarding the components of data center 110 are provided below in connection with the discussion of FIG. 2.

Terminals 140-170 may be any type device for communicating with the resources of data center 110 and/or other systems (not shown) over network 130. Terminals 140-170 may be personal computers, handheld devices (e.g., PDAs, cellular phones, etc.), or any other appropriate computing platform or device capable of exchanging data with network 130. For example, terminals 140-170 may each include a processor (not shown) and a memory (not shown). Terminals 140-170 may further execute program modules that provide one or more graphical user interfaces (GUIs) for interacting with network resources, such as the resources of data center 110. Alternatively, in other embodiments, users of terminals 140-170 may access the resources of data center 110 through other network mechanisms, such as through an application programming interface (API) of a Web service.

Consistent with disclosed embodiments, terminals 140-170 may be used by various users of computing services that are provided by a computer infrastructure services provide associated with data center 110. For example, the users (e.g., administrators) may use terminals 140-170 to access and/or receive data from the resources of data center 110. Users of the computing services may be divided into service categories, such as dedicated program execution capacity users, on-demand variable program execution capacity users, and excess program execution capacity users. Service categories are discussed in further detail in connection with the following discussion of FIG. 2.

Figure 2:
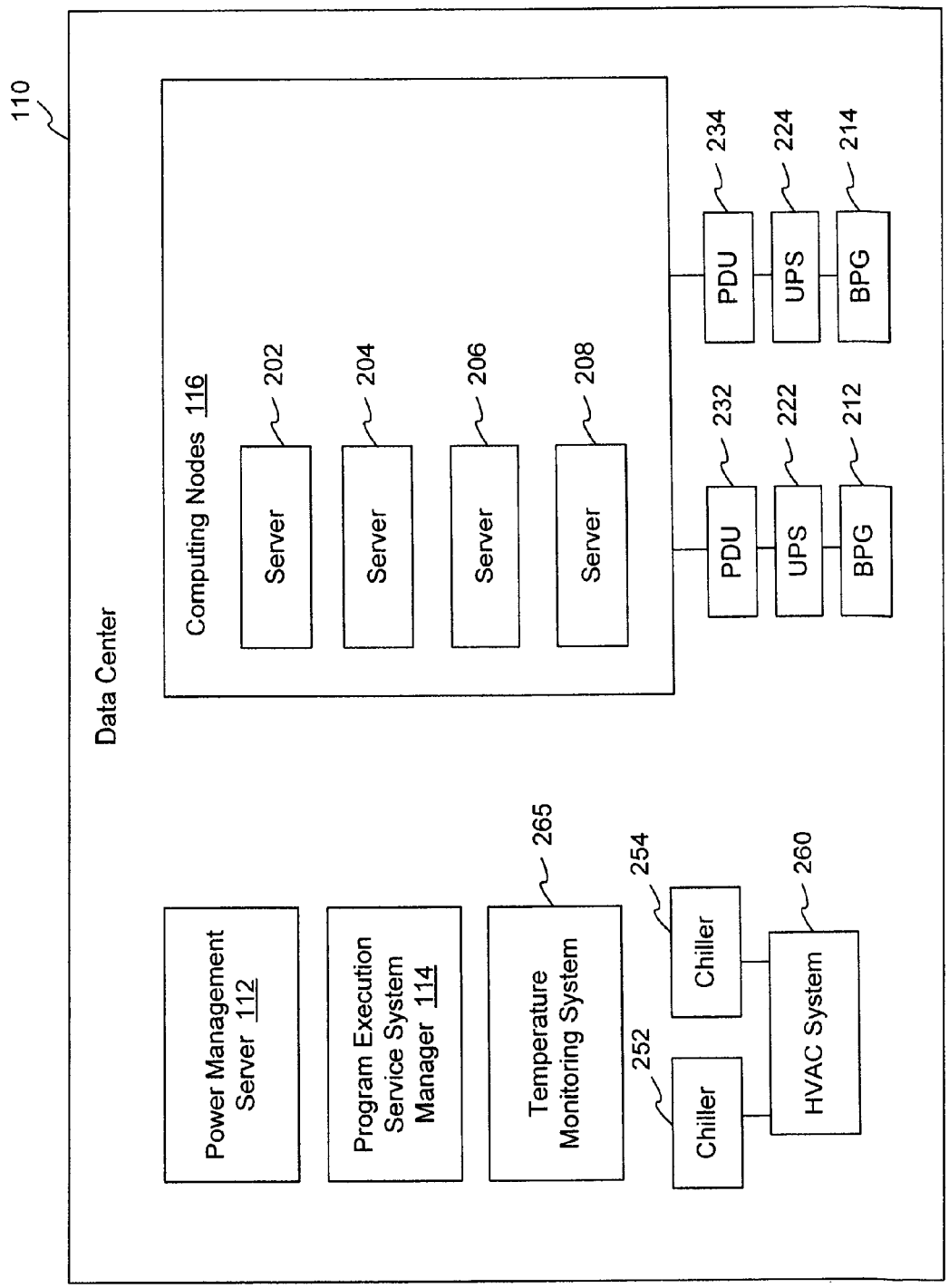
FIG. 2 is a diagram of an example of a data center.

FIG. 2 is a diagram of an example of components of data center 110, consistent with a disclosed embodiment. As discussed above, data center 110 may include resources such as computing nodes 116, which are made available to users over network 130. Additionally, as discussed above, data center 110 may include power management server 112 and program execution service system manager 114. In accordance with disclosed embodiments, power management server 122 may monitor and manage the electrical power consumption of the resources of data center 110. Furthermore, data center 110 may include other components, as discussed below, which facilitate and/or support the resources of data center 110.

As shown in FIG. 2, computing nodes 116 may comprise servers 202-208, which may be housed in a server rack (not shown). For example, a certain number of servers (e.g., four servers) may be housed in a single server rack. Additional server racks (not shown) may house additional servers (not shown) that are included in computing nodes 116. Servers 202-208 may communicate via an internal network (not shown) within data center 110 with other servers that are located in data center 110 and/or via network 130 with additional servers that are located outside of data center 110. Accordingly, servers 202-208 may distribute processes for parallel execution among a plurality of servers. Alternatively, servers 202-208 may be specially constructed for storing data and/or executing applications.

Servers 202-208 may each include a processor (not shown), a memory (not shown), and a data store (not shown) for storing data (e.g., applications and/or data of users that receive services from a computer infrastructure services provider maintaining and/or operating data center 110). The data store may comprise a plurality of storage devices, such as disk storage devices, optical storage devices, etc. For example, the data store may comprise multiple disk drives that combine to form a disk array. The disk array may include, for example, a disk array controller, a cache, disk enclosures, and a power supply. The disk array controller may connect to network 130 via a port (not shown), which may serve as an interface between the disk array controller and network 130.

Components of data center 110 that facilitate and/or support servers 202-208 may include backup power generators 212-214, uninterruptible power supplies 222-224, and power distribution units 232-234. Data center 110 may further include components such as chillers 252-254, as well as a heating, ventilation and air-conditioning system 260 and a temperature monitoring system 265. Furthermore, although not shown in FIG. 2, data center 110 may include other components that facilitate communications among the resources of data center 110. For example, data center 110 may include routers, network switches, and communications links that facilitate communications among the components of data center 110 and/or facilitate communications over network 130.

Backup power generators (BPGs) 212-214 may comprise batteries for storing power in the event that power is unavailable to data center 110. For example, BPGs 212-214 may be physically located within or outside of data center 110. Uninterruptible power supplies (UPSs) 222-224 may provide backup power to components of data center 110, such as servers 202-208, if an unexpected power disruption occurs that could cause an outage or data loss. Power distribution units (PDUs) 232-234 may comprise devices that distribute electric power to components of data center 110, such as servers 202-208.

Chillers 252-254 may comprise cooling systems that cool the water of heating, ventilation and air-conditioning (HVAC) units. Chillers 252-254 may each have dedicated power supplies (not shown). HVAC system 260 may comprise HVAC units that are used to control the temperature and humidity of data center 110. Temperature monitoring system 265 may monitor the temperature and/or the humidity inside and/or outside of data center 110. For example, temperature monitoring system 265 may comprise sensors that are located inside and/or outside of data center 110. The sensors may provide environmental condition data (e.g., temperature, humidity, and/or other environmental data).

Program execution service (PES) system manager 114 may manage the execution of programs for multiple users, such as programs executing on computing nodes 116 (e.g., servers 202-208). As discussed above, users who receive services from a computer infrastructure services provider associated with data center 110 may be subdivided into various service categories, such as dedicated program execution capacity users, on-demand variable program execution capacity users, and excess program execution capacity users. These categories may represent various levels of services that the computer infrastructure services provider has agreed to provide the users through, for example, a service agreement. Dedicated program execution capacity users, on-demand variable program execution capacity users, and excess program execution capacity users are discussed next in more detail.

Dedicated program execution capacity users may receive priority access relative to other users to use a respective amount of program execution capacity that is made available to users via one or more of servers 202-208. The priority access of the users may be based on each of the users having dedicated or exclusive access to use the respective amount of program execution capacity. For example, a respective amount of program execution capacity may be allocated to a particular user for dedicated access over a specified period of time, such as in a manner analogous to a lease of one or more physical computing systems so that the respective amount of program execution capacity may be available for executing programs on behalf of the user throughout the specified period of time. For example, a user may be given preferential or other dedicated access to execute programs based on one or more factors, such as fees paid by the user, an agreement to a contractual obligation for using the dedicated access for a period of time and/or subject to other conditions, etc.

On-demand variable program execution capacity users may submit requests to execute programs at a certain time (e.g., immediately upon request of those users, at an indicated future time, at some time during an indicated future time period, etc.), such that one or more programs indicated by such a request may be executed if computing resources (e.g., servers 202-208) sufficient to satisfy the requested execution are available at (or near) the requested time, but without such a request being guaranteed to be satisfied.

Excess program execution capacity users may execute programs by making use of otherwise unused program execution capacity of servers 202-208 on a temporary or non-guaranteed basis. For example, the excess program execution capacity may be available to execute such programs until a time that the program execution capacity is desired for other purposes (e.g., for preferential or reserved use by one or more other users). In some cases, one or more programs may be executing on behalf of a user using excess program execution capacity at the time that the excess program execution capacity is desired for other purposes and, in some such cases, the execution of the programs may be automatically terminated (e.g., shut down, aborted, etc.) so as to be available for the other purposes. Programs that are automatically terminated may be automatically restarted on behalf of the user at a future time, such as a future time when a sufficient amount of excess program execution capacity again becomes available to execute the programs for the user.

Accordingly, PES system manager 114 may coordinate the program execution capacity of servers 202-208 in accordance with the service categories of various users, such as dedicated program execution capacity users, on-demand variable program execution capacity users, and excess program execution capacity users. Additional details describing systems and methods for managing program execution capacity are provided, for example, in U.S. application Ser. No. 12/334,022, filed Dec. 12, 2008, entitled "Managing Use of Program Execution Capacity," the entire contents of which are expressly incorporated herein by reference.

Power management server 112 may provide functionality for monitoring and managing the power consumption of components of data center 110, such as servers 202-208. As shown in FIGS. 1 and 2, power management server 112 is located in data center 110. However, in other embodiments, power management server 112 may be located at another location that is separate from data center 110 and instead may provide services to data center 110 over network 130. Additional details regarding power management server 112 are discussed below in connection with FIG. 3.

Figure 3:
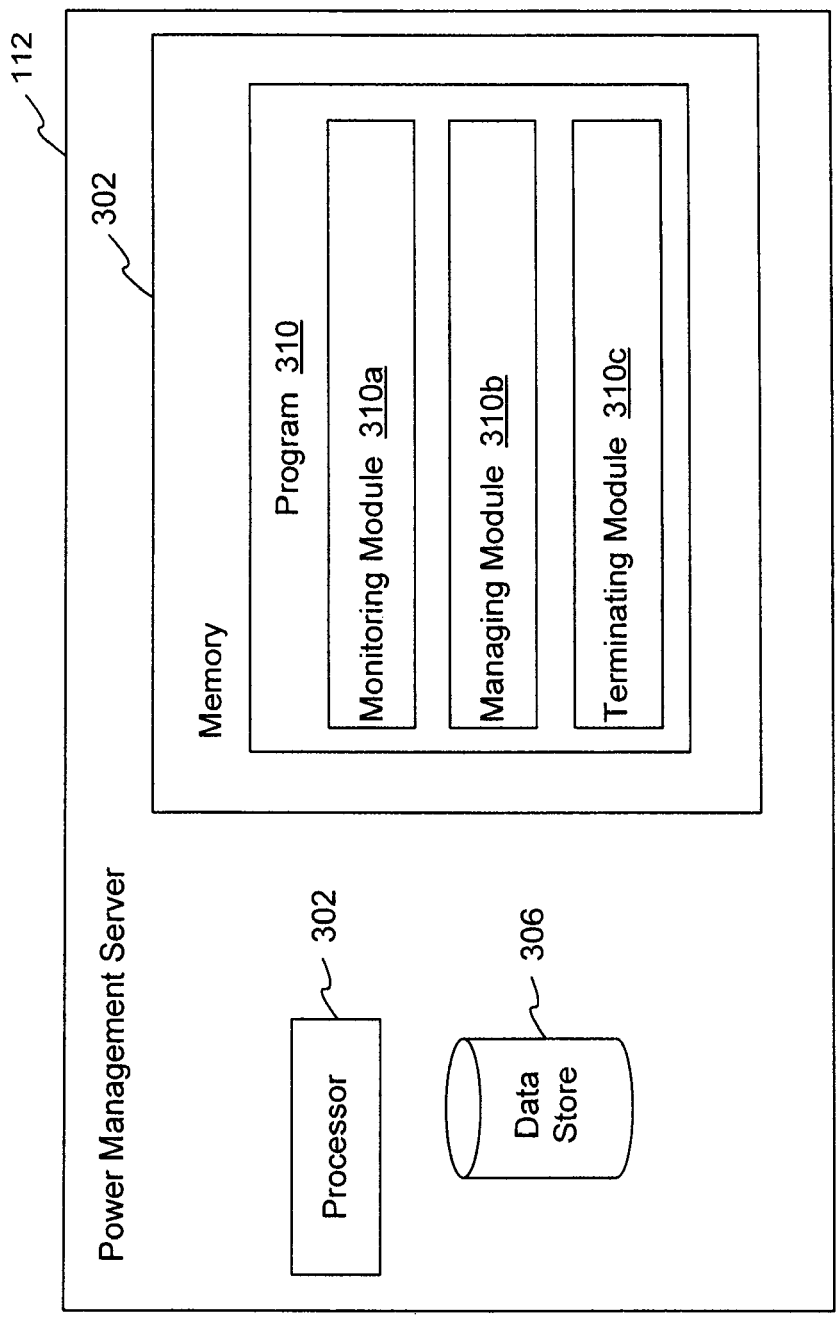
FIG. 3 is a diagram of an example of an architecture of a power management server.

FIG. 3 is diagram of an example of an architecture of power management server 112, consistent with a disclosed embodiment. As discussed above, power management server 112 may provide functionality for monitoring and managing power consumption of resources in data center 110, such as servers 202-208.

Power management server 112 may comprise a general purpose computer (e.g., a personal computer, network computer, server, or mainframe computer) having one or more processors that may be selectively activated or reconfigured by a computer program stored in memory. As shown in FIG. 3, power management server 112 may include a processor 302, a memory 304, and a data store 306.

Memory 304 may comprise one or more memory or storage devices that store data as well as software. Memory 304 also may comprise, for example, one or more of RAM, ROM, magnetic storage, or optical storage. For example, memory 304 may store program modules that, when executed by processor 302, perform one or more processes for managing electronic power consumption through the shedding or terminating of programs executing on one or more of servers 202-208.

Data store 306 may store data collected from resources of data center 110, such as servers 202-208, BPGs 212-214, UPSs 222-224, PDUs 232-234, chillers 252-254, HVAC system 260, etc. Furthermore, data store 306 may store rules specifying procedures for terminating program instances being executed on servers 202-208 and/or shutting down resources of data center 110. For example, as discussed above, a computer infrastructure services provider may supply resources (e.g., servers 202-208) of data center 110 according to service categories, such as dedicated program execution capacity users, on-demand variable program execution capacity users, and excess program execution capacity users. Consistent with disclosed embodiments, when power consumption within data center 110 approaches supply, power management server 112 may selectively shed or terminate loads of servers 202-208 by terminating certain programs (i.e., program instances being executed on servers 202-208) and/or by shutting down resources entirely. The termination of program instances and/or resources may be according to any number of metrics, such as business rules specifying a priority or hierarchy of users associated with the program instances and/or resources. Furthermore, the termination of a program instance may evacuate a resource (e.g., a server), enabling the resource to be powered down.

In one embodiment, after a condition has occurred (e.g., power consumption within data center 110 meets or exceeds a threshold, which may indicate that data center 110 is near its supply limit), power management server 112 may terminate program instances used by excess program execution capacity users. For example, a threshold may be set or adjusted by the data center operator, based on environmental conditions. In response to the determination that the power threshold has been met or exceed, power management server 112 may directly terminate one or more program instances through one or more commands transmitted to one or more of servers 202-208. Alternatively, in other embodiments, power management server 112 may transmit one or more commands to program execution service system manager 114, which, in turn, may terminate the one or more program instances being executed on one or more of servers 202-208. Consistent with disclosed embodiments in which program instances of excess program execution capacity users are terminated, servers 202-208 may continue to provide services for dedicated and on-demand variable program execution capacity users.

In one embodiment, power management server 112 may provide a software architecture for monitoring and managing power consumption of resources in data center 110. The software architecture may be stored in, for example, memory 304 of power management server 112. The software architecture may provide a program 310, which is executed by processor 302. Program 310 may includes instructions in the form of one or more program modules 310a-310c. As shown in FIG. 3, program modules 310a-310c may include a monitoring module 310a, a managing module 310b, and a terminating module 310c.

Monitoring module 310a may continuously or periodically collect performance telemetry from components within data center 110. For example, monitoring module 310a may receive data from one or more of servers 202-208, BPGs 212-214, UPSs 222-224, PDUs 232-234, chillers 252-254, HVAC system 260, and any other components of data center 110. The collected performance telemetry may include the loads of one or more of servers 202-208. For example, a load of one of servers 202-208 may comprise a total number of outstanding requests for one of servers 202-208, a utilization rate of a processor of one of servers 202-208, and/or a utilization rate of a memory of one of servers 202-208. Furthermore, the collected performance telemetry may include a power consumption rate of one or more servers 202-208 and/or one or more of other components of data center 110, such as BPGs 212-214, UPSs 222-224, PDUs 232-234, chillers 252-254, HVAC system 260, etc.

Managing module 310b may implement rules specifying procedures for terminating program instances being executed on servers 202-208 and/or shutting down resources, such as servers 202-208. For example, managing module 310b may continuously or periodically evaluate telemetry collected by monitoring module 310a according to the rules. Furthermore, when power consumption within data center 110 meets or exceeds a threshold, which may indicate that it is near its supply limit, managing module 310b may determine, according to the rules, which program instances being executed on servers 202-208 to terminate and/or which resources within data center 110 to shut down.

In one embodiment, when a condition has occurred (e.g., power consumption within data center 110 meets or exceeds a threshold, which may indicate that it is near its supply limit), power management server 112 may terminate one or more program instances of excess capacity users in order to decrease power consumption within data center 110 to within available power capacity or to a predetermined threshold value. Furthermore, in other embodiments, managing module 310b may prioritize service categories for termination. Managing module 310b may determine, based on data stored in data store 306, for example, that program instances of excess program execution capacity users should be terminated first, followed by program instances of on-demand variable program execution capacity users, and then followed by dedicated program execution capacity users until a sufficient power reduction has occurred. Sufficient power reduction may be indicated by power consumption falling below the threshold.

As part of determining whether to terminate program instances, managing module 310b may model conditions within data center 110 based on collected telemetry data to anticipate increases in power utilization that may require terminating program instances and/or shutting down of components within data center 110. For example, managing module 310b may determine weather trends, such as increases in temperature outside and/or inside of data center 110 to predict when temperatures may cause, for example, chillers 252-254 and/or HVAC system 260 to consume increased amounts of power.

Furthermore, managing module 310b may determine, in some circumstances, that an entire server (e.g., one of servers 202-208) should be shut down. This determination may factor in data received over network 130 indicating that certain data being stored at data center 110 has been replicated across multiple data centers in other locations. Accordingly, in some embodiments, managing module 310b may determine, for example, that certain servers supported by a particular PDU should be shut down or that certain servers supported by a particular chiller should be shut down.

For example, managing module 310b may evaluate terms of a service agreement as part of determining whether or not a server should be shut down. As part of the evaluation, managing module 310b may determine whether or not shutting down the server is consistent with terms of one or more service agreements (e.g., a term related to providing a particular class or level of service to a user) corresponding to one or more users having data stored on the server. As part of the evaluation, managing module 310b may determine whether or not data of one or more users is available through another resource (e.g., another server stores a copy of the one or more users' data). Alternatively, managing module 310b may determine whether, consistent with the service agreement, it is acceptable to power down a server storing data for one or more users. For example, a service agreement may allow a particular level of latency (e.g., a delay before the data becomes accessible due to the time needed to power on the server) as part of the terms of service. As yet another alternative, managing module 310b may determine that data has not been accessed in a certain time period (i.e., the data is considered "cold") and, accordingly, managing module 310b may power down a server storing the data, because it is not anticipated that the data will be accessed for a certain time interval. As discussed above, in some embodiments, replicas of data that becomes unavailable may be available through other resources (e.g., other servers at the same or other data centers).

Terminating module 310c may terminate selected instances, such as excess capacity program instances, and/or shut down one or more resources of data center 110. Terminating module 310c may directly terminate one or more program instances and/or shut down one or more resources through one or more commands transmitted to one or more of servers 202-208. Alternatively, terminating module 310c may transmit one or more commands to program execution service system manager 114, which, in turn, may terminate the one or more program instances being executed on one or more of servers 202-208 and/or shut down the one or more resources.

In one embodiment, the execution of program instances may be automatically terminated (e.g., shut down, aborted, etc.) to make the capacity available for other purposes. Programs of users that are automatically terminated may be automatically restarted on behalf of the users at a future time, such as a future time when power consumption decreases and a sufficient amount of excess program execution capacity becomes available to execute the programs for the users.

Figure 4:
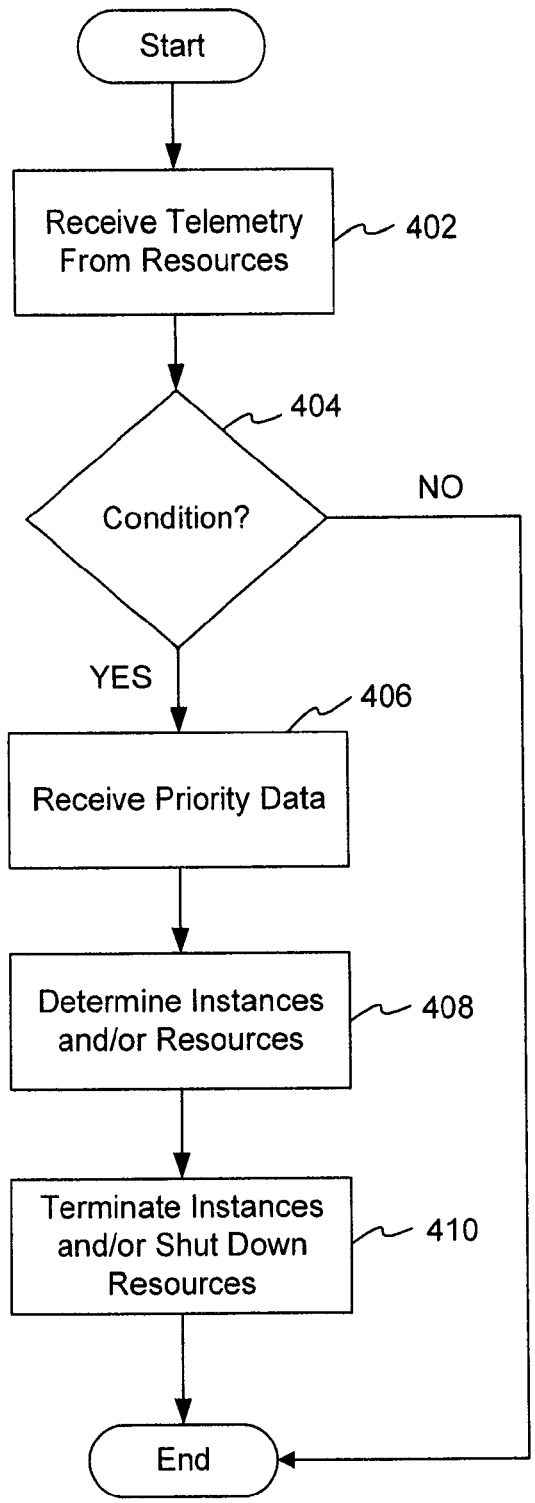
FIG. 4 is a flow diagram of an example of a routine for monitoring and managing power consumption of resources in a data center.

FIG. 4 is a flow diagram of an example of a routine 400 for monitoring and managing power consumption of resources in data center 110, consistent with a disclosed embodiment. Routine 400 provides an overview of a process in which power management server 112 monitors and manages resources, such as servers 202-208.

In block 402, power management server 112 may receive telemetry data regarding resources and data center 110. For example, as discussed above, power management server 112 may continuously or periodically receive performance telemetry from components within data center 110. The performance telemetry may relate to a condition, such as power consumption, temperature, or other conditions (e.g., processing loads).

In block 404, power management server 112 may determine whether to terminate program instances and/or shut down resources. The decision to terminate program instances and/or shut down resources may relate to a condition in data center 110 that has occurred, such as a condition that has approached or exceeded a threshold. For example, power consumption in the data center may be reaching a limit that may have been established by an operator of data center 110 to prevent polder consumption from exceeding supply. The determination may be based on collected telemetry data and/or modeling done by power management server 112 to anticipate increases in power utilization that may require terminating program instances and/or shutting down resources. For example, power management server 112 may use modeling data, such as temperature trends, as part of the determination.

If power management, server 112 determines in block 404 that the condition has not occurred (e.g., power consumption is below a threshold), routine 400 may end. However, if power management server 112 determines that the condition has occurred (e.g., power consumption is at or above a threshold), routine 400 may proceed to block 406.

In block 406, power management server 112 may receive priorities of service categories and/or resources. Power management server 112 may prioritize service categories and/or resources using, for example, data stored in data store 306. For example, power management server 112 may determine that program instances of excess program execution capacity users should be terminated first, followed by program instances of on-demand variable program execution capacity users, and then followed by dedicated program execution capacity users until power consumption ails below the threshold.

Furthermore, in other embodiments, priority data may include data reflecting priorities based on other terms of service. For example, power management server 112 may determine whether powering down a server is consistent with terms of the service agreement (e.g., a term related to providing a particular class or level of service to a user). As part of the determination, management server 112 may consider whether data of one or more users is available through another resource (e.g., another server stores a copy of the one or more users' data). Alternatively, management server 112 may determine whether, consistent with the service agreement, it is acceptable to power down a server storing data for one or more users (e.g., terms of service provide for an acceptable delay before the data becomes accessible or data has not been accessed in a certain time period).

In block 408, power management server 112 may determine one or more program instances to terminate on certain ones of computing nodes 116 (e.g., on certain ones of servers 202-208) and/or one or more resources to shut down. For example, power management server 112 may determine that terminating program instances of a certain number of excess capacity users will result in a recovery of a sufficient amount of power to continue operations of data center 110 without losing components. Furthermore, in some embodiments, power management server 112 may determine that certain resources should be shut down entirely (e.g., certain servers, UPSs, PDUs, etc.). As discussed above, the determination may be based one whether or not shutting down a resource (e.g., a server) is acceptable based on a service agreement with a user having data stored on the resource.

In block 410, power management server 112 may terminate the one or more program instances and/or shut down one or more resources. This may be accomplished by terminating execution of selected instances, such as excess capacity program instances. As discussed above, power management server 112 may directly terminate one or more program instances and/or shut down one or more resources through one or more commands transmitted to, for example, one or more of servers 202-208. Alternatively, power management server 112 may transmit one or more commands to program execution service system manager 114, which, in turn, may terminate the one or more program instances being executed on one or more of servers 202-208 and/or shut down the one or more resources. Accordingly, the execution of the programs may be automatically terminated (e.g., shut down, aborted, etc.) to make that capacity available for the other purposes. Furthermore, in some embodiments, power management server 112 may shut down components entirely, as discussed above.

As one of ordinary skill in the art will appreciate, one or more of blocks 402-410 may be optional and may be omitted from implementations in certain embodiments. Furthermore, functionality provided by one or more of blocks 402-410 may be subdivided into multiple blocks or combined.

The foregoing description has been presented for purposes of illustration. It is not exhaustive and is not limited to the precise forms or embodiments disclosed. Modifications and adaptations will be apparent to those skilled in the art from consideration of the specification and practice of the disclosed embodiments. For example, the described implementations include software, but systems and methods consistent with the disclosed embodiments be implemented as a combination of hardware and software or in hardware alone. Examples of hardware include computing or processing systems, including personal computers, servers, laptops, mainframes, micro-processors and the like. Additionally, although aspects of the disclosed embodiments are described as being stored in memory, one skilled in the art will appreciate that these aspects can also be stored on other types of computer-readable media, such as secondary storage devices, for example, hard disks, floppy disks, or CD-ROM, or other forms of RAM or ROM, USB media, DVD, or other optical drive media.

Computer programs based on the written description and disclosed methods are within the skill of an experienced developer. The various programs or program modules can be created using any of the techniques known to one skilled in the art or can be designed in connection with existing software. For example, program sections or program modules can be designed in or by means of .Net Framework, .Net Compact Framework (and related languages, such as Visual Basic, C, etc.), Java, C++, Objective-C, HTML, HTML/AJAX combinations, XML, or HTML with included Java applets. One or more of such software sections or modules can be integrated into a computer system or existing e-mail or browser software.

Moreover, while illustrative embodiments have been described herein, the scope of any and all embodiments having equivalent elements, modifications, omissions, combinations (e.g., of aspects across various embodiments), adaptations and/or alterations as would be appreciated by those skilled in the art based on the present disclosure. The limitations in the claims are to be interpreted broadly based on the language employed in the claims and not limited to examples described in the present specification or during the prosecution of the application, which examples are to be construed as non-exclusive. Furthermore, the blocks of the disclosed routines may be modified in any manner, including by reordering blocks and/or inserting or deleting blocks. It is intended, therefore, that the specification and examples be considered as illustrative only, with a true scope and spirit being indicated by the following claims and their full scope of equivalents.

What is claimed is:

1. A computer-implemented method comprising:
   obtaining, by a management server computer, performance data related to operation of a plurality of computer-related resources;
   modeling, by the management server computer and based at least in part on the obtained performance data, a predicted future condition related to the operation of the plurality of computer-related resources;
   determining, by the management server computer and based at least in part on the predicted future condition, to terminate one or more executing program instances to reduce usage of the plurality of computer-related resources;
   selecting, by the management server computer and in response to the determining, at least one executing program instance to terminate using priority data associated with the at least one program instance; and terminating, by the management server computer and in response to the determining, the selected at least one program instance.

2. The computer-implemented method of claim 1 wherein the plurality of computer-related resources include one or more servers on which the at least one program instance is executing before the determining.

3. The computer-implemented method of claim 2 wherein the one or more servers are located in a data center, and wherein the obtained performance data includes a temperature within the data center.

4. The computer-implemented method of claim 2 wherein the one or more servers are located in a data center, and wherein the obtained performance data includes a temperature external to the data center.

5. The computer-implemented method of claim 2 wherein the obtained performance data includes a power consumption level for the one or more servers.

6. The computer-implemented method of claim 2 wherein the one or more servers are located in a data center, and wherein the obtained performance data includes an environmental condition related to the data center.

7. The computer-implemented method of claim 2 wherein the obtained performance data includes a processing load for the one or more servers.

8. The computer-implemented method of claim 2 wherein the one or more servers further execute one or more other program instances for one or more dedicated program execution capacity users who receive dedicated access of a specified amount of program execution capacity, and wherein the priority data further indicates that the at least one program instance has a lower priority than the one or more other program instances.

9. The computer-implemented method of claim 2 wherein the one or more servers further execute one or more other program instances for one or more on-demand variable program execution capacity users who do not use excess program execution capacity, and wherein the priority data further indicates that the at least one program instance has a lower priority than the one or more other program instances.

10. The computer-implemented method of claim 1 wherein the modeling of the predicted future condition includes modeling an anticipated increase in power utilization by one or more computer-related resources of the plurality of computer-related resources.

11. The computer-implemented method of claim 10 wherein the obtained performance data includes telemetry data indicating current power utilization by the one or more computer-related resources.

12. The computer-implemented method of claim 10 wherein the obtained performance data includes temperature data, and wherein the modeling of the predicted future condition further includes determining a trend in temperature changes that is predicted to result in the anticipated increase in power utilization.

13. The computer-implemented method of claim 10 wherein the modeling of the predicted future condition further includes determining a weather trend that is predicted to result in the anticipated increase in power utilization.

14. The computer-implemented method of claim 1 wherein the modeling of the predicted future condition further includes determining a weather trend, and determining the predicted future condition based on the determined weather trend.

15. The computer-implemented method of claim 1 wherein the at least one program instance is executed on behalf of one or more excess program execution capacity users who use excess program execution capacity, and wherein the priority data associated with the at least one program instance is a priority of the one or more excess program execution capacity users that is lower than one or more other priorities of one or more other users.

16. The computer-implemented method of claim 1 wherein the terminating of the selected at least one executing program instance includes powering down one or more of the plurality of computer-related resources that had been being used by the selected at least one executing program instance before the terminating.

17. The computer-implemented method of claim 1 wherein the management server computer is affiliated with a program execution service that executes program instances for a plurality of users, and wherein the at least one program instance is executed by the program execution service for at least one of the plurality of users.

18. A computer system comprising:
a processor for executing program instructions; and
a memory storing the program instructions, wherein the program instructions, upon execution by the processor, cause the system to:
obtain performance data related to operation of one or more computer-related resources;
model a predicted future condition related to the operation of the one or more computer-related resources based at least in part on the obtained performance data;
determine, based at least in part on the predicted future condition, to terminate one or more executing program instances to reduce usage of the one or more computer-related resources, and selecting in response at least one program instance to terminate; and
terminate, in response to the determining, the selected at least one program instance.

19. The computer system of claim 18 wherein the one or more computer-related resources include one or more servers on which the at least one program instance is executing before the determining, and wherein the obtained performance data indicates one or more current conditions of a data center in which the one or more servers are located.

20. The computer system of claim 19 wherein the one or more servers further execute one or more other program instances, and wherein the selecting of the at least one program instance to terminate is further based on priority data that indicates that the at least one program instance has a lower priority than the one or more other program instances.

21. The computer system of claim 18 wherein the modeling of the predicted future condition includes modeling an anticipated increase in power utilization by the one or more computer-related resources, and wherein the obtained performance data includes telemetry data indicating at least one of a group of data types including power utilization by the one or more computer-related resources, temperature data associated with the one or more computer-related resources, or a processing load for the one or more computer-related resources.

22. The computer system of claim 18 wherein the modeling of the predicted future condition further includes determining a weather trend, and determining the predicted future condition based on the determined weather trend.

23. A computer-implemented method comprising:
monitoring, by a management server computer, a plurality of computer-related resources for a data center to determine performance data related to operation of the plurality of computer-related resources;

modeling, by the management server computer and based at least in part on the performance data, a predicted future condition related to the operation of the plurality of computer-related resources;

determining, by the management server computer and based at least in part on the predicted future condition, at least one resource of the plurality to terminate or shut down using associated priority data to reduce usage of the plurality of computer-related resources; and terminating or shutting down, by the management server computer, the determined at least one resource.

24. The computer-implemented method of claim 23 wherein the plurality of computer-related resources includes multiple servers and multiple program instances executing on the multiple servers, and wherein the determined performance data includes at least one of a group of data types including power utilization by the multiple servers, temperature data associated with the multiple servers, or a processing load for the multiple servers.

25. The computer-implemented method of claim 24 wherein the determining of the at least one resource to terminate or shut down includes selecting the at least one resource to be one of the one or more executing program instances in response to the determining, and wherein the terminating or shutting down of the at least one resource includes terminating execution of the selected one program instance or shutting down one of the multiple servers on which the selected one program instance is executing.

* * * * *